July 28, 1925.
J. V. BRENNAN
REFRIGERATOR CABINET
Filed Jan. 16, 1922
1,547,199
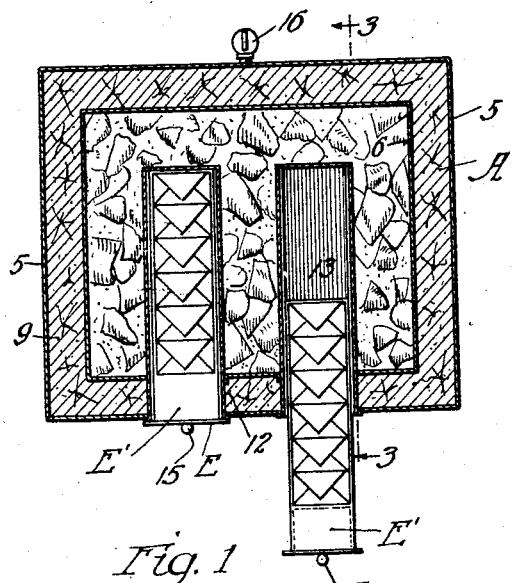
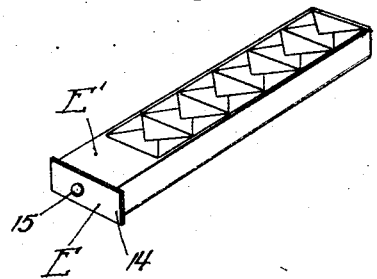
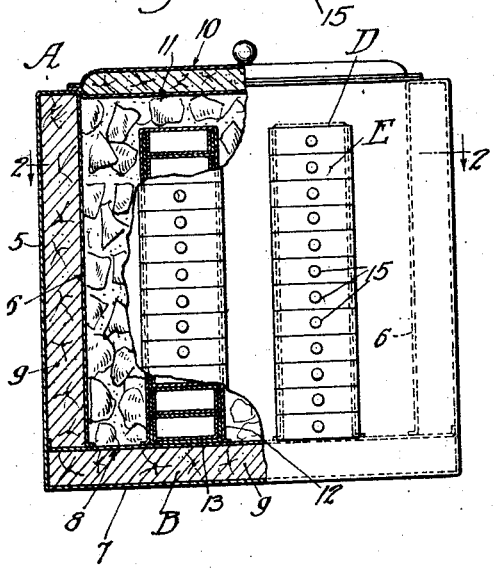
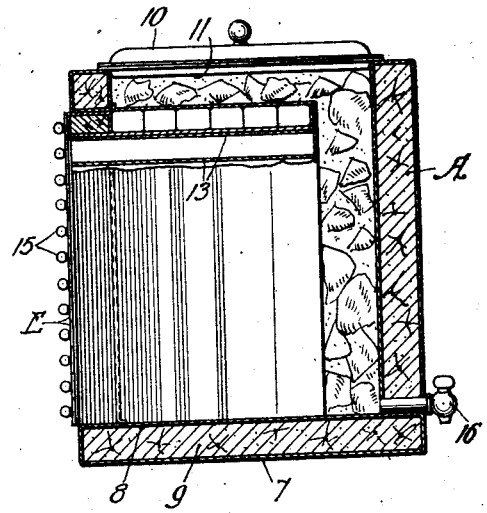
Inventor:
Joseph V. Brennan.
By: Gabel & Mueller
Attys.

Patented July 28, 1925.

1,547,199

UNITED STATES PATENT OFFICE.

JOSEPH V. BRENNAN, OF CHICAGO, ILLINOIS.

REFRIGERATOR CABINET.

Application filed January 16, 1922. Serial No. 529,658.

*To all whom it may concern:*

Be it known that I, JOSEPH V. BRENNAN, a citizen of the United States, residing at Chicago, in the county of Cook and State of Illinois, have invented a certain new and useful Improvement in Refrigerator Cabinets, of which the following is a full, clear, concise, and exact description, reference being had to the accompanying drawings, forming a part of this specification.

My invention relates to refrigerator cabinets and has to do more particularly with a drawer cabinet. An object of my invention is to provide an improved structure of the character described wherein the drawers extend into an inner icing chamber and are insulated against atmospheric exposure on all sides.

My invention is more useful for holding ice cream bricks and more particularly adapted for holding the small so-called ice cream cakes recently placed upon the market. These small confection-covered ice cream cakes at the present time are expensively handled and the dealers find it very inconvenient and expensive to stock and dispense them. They are packed in cartons or individually and placed in the usual large box containers packed in ice. Each time one of the small cakes is sold it is necessary to open up the container which is packed in ice and take out one of the cartons and remove an ice cream cake. This not only takes a great deal of time for the sale of such a small article but also exposes the entire contents of the container to the atmosphere, thus raising the temperature and in time softening the cakes. It also causes a more rapid melting of the ice.

In my improved refrigerator cabinet I do away with these various objections by providing an insulated icing cabinet having an inner drawer chamber adapted to receive a plurality of individually operable drawers insulated against atmospheric exposure while the drawers are closed thereby effecting a saving in ice and also by the simple manipulation providing a cheap method of handling these inexpensive articles.

Although the cabinet is particularly useful for handling the so-called small ice cream cakes it is not limited thereto, in that there are other features of construction which render it very adaptable and advantageous for holding the ordinary ice cream brick.

For a better understanding of my invention reference is to be had to the accompanying drawing in which—

Fig. 1 is a front view of the cabinet partly broken away to show the interior construction;

Fig. 2 is a sectional view along the line 2—2 of Fig. 1;

Fig. 3 is a side elevation of Fig. 1 partly in section; and

Fig. 4 is a detail view of the preferred drawer construction.

Referring now more in detail to the construction shown, I provide a cabinet having an outer insulating chamber A constucted of vertical metallic walls 5—6 suitably sealed at the edges. An insulating base is also provided having an insulating chamber B made up of metallic walls 7—8 suitably sealed at the meeting edges. Between the inner and outer walls of this outer insulating chamber I preferably insert cork, placing suitable slabs 9 therein. This outer and base insulating chamber thus provides an icing chamber C, and a removable top or cover is provided consisting of inner and outer metallic walls 10—11 filled with suitable insulating material and preferably a cork slab.

Extending into the icing chamber are the drawer chambers D, being made up of sheet metal sides 12 suitably sealed at their edges and also sealed at the bottom so as to exclude the water and moisture from the icing chamber. I provide a plurality of independently operable drawers E which extend into the drawer chamber and slide on metallic U-shaped supports 13 suitably secured to the walls of the drawer chamber so as to provide independent drawer chambers. The drawers E are preferably constructed with an insulated front-end so that the receptacle portions of the drawers are entirely protected against atmospheric exposure while the drawers are closed. Also, I thus provide an icing chamber which is entirely surrounded by an insulated wall or chamber. The body portions of the drawers are preferably made up of a single metal sheet having bottom, rear and side portions folded up and sealed at the rear vertical meeting edges. The front or insulated end E′ of the drawer consists of a chamber made by forming an extending end of the bottom upwardly, then rearwardly and downwardly between the sides. A suitable insulation is placed in this chamber, preferably a cork slab. I then 37 is integrally formed with the lower end of the handle member 26 and is engageable with the ratchet teeth or serrations 36. With this form of the invention the operation is similar to that of the form shown in Figures 1 and 2 and hereinabove described since the jaws 27 and 28 may be readily adjusted when the bar 30 is centered in the socket 31 whereas these jaws are bound or held in adjusted position when the handle members 25 and 26 are gripped. The spring finger or pawl 37 coacts with the serrations or ratchet teeth 36 to releasably hold the handle members 25 and 26 in any adjustment.

I claim:

An adjustable thin model two handled wrench, the opposing inner faces of each handle spaced apart and substantially parallel at all adjustments, the handle having their corresponding ends provided with integral and rigid jaw extensions, said extensions disposed angularly in the same direction with respect to the handles, whereby the jaw faces are correspondingly angularly disposed and their working faces substantially parallel, said jaw extensions simultaneously adjustable with the handles, one extension having an integral locking bar extending at a right angle from its inner face, said bar having its side faces oppositely tapered to define a sharp central ridge lengthwise thereof, the other extension having an alining and similarly shaped transverse bore therethrough adapted to loosely receive said locking bar, whereby the jaws may be securely locked on the work by a compressing grip on the inner spaced apart free ends of the handles by causing the central ridge of the locking bar to bite into the inner walls of the said transverse bore.

LINCOLN BRADEN.